United States Patent

Nakajima et al.

[11] Patent Number: 5,972,268
[45] Date of Patent: Oct. 26, 1999

[54] METHOD OF FORMING A CORNER PART OF A WEATHER STRIP

[75] Inventors: Takao Nakajima, Inazawa; Hisao Hanabusa, Bisai; Katsunori Kawai, Nishikasugai-gun; Tatsuhiko Nagata, Kounan, all of Japan

[73] Assignee: Toyoda Gosei Co., Ltd., Aichi, Japan

[21] Appl. No.: 09/187,423

[22] Filed: Nov. 6, 1998

[30] Foreign Application Priority Data

Nov. 6, 1997 [JP] Japan ................................ 9-322476

[51] Int. Cl.$^6$ ............................. B29B 11/02; B29C 45/14
[52] U.S. Cl. .......................... 264/138; 264/259; 264/261; 264/295; 425/112; 425/129.1
[58] Field of Search .................................. 264/138, 295, 264/261, 259; 425/112, 108, 129.1

[56] References Cited

U.S. PATENT DOCUMENTS

| 5,035,937 | 7/1991 | Nozaki ................................. 428/122 |
| 5,258,157 | 11/1993 | Nozaki et al. ........................ 264/261 |
| 5,374,386 | 12/1994 | Nagata ................................. 264/145 |
| 5,407,628 | 4/1995 | Nozaki et al. ........................ 264/261 |
| 5,711,907 | 1/1998 | Nozaki et al. ........................ 264/138 |

FOREIGN PATENT DOCUMENTS

| 403130136 | 6/1991 | Japan ................................. 425/108 |
| 6-138855 | 5/1994 | Japan . |

*Primary Examiner*—Jan H. Silbaugh
*Assistant Examiner*—Dae Young Lee
*Attorney, Agent, or Firm*—Pillsbury Madison & Sutro LLP

[57] ABSTRACT

A method of forming a molded seal portion onto a corner part of a weather strip without generating any molding defect due to variations in the injection amount, injection pressure or the like of the molding material. A seal portion projecting from one side wall of a trim portion is partly cut off, the remaining trim portion is bent to a corner configuration and placed in a mold, and a molding material for the seal portion is injected into a cavity of the mold from the position corresponding to a longitudinally extending base end edge of the molded seal portion such that the molding material flows from the side of the longitudinally extending base end edge of the molded seal portion towards a distal end edge thereof to fill the cavity.

4 Claims, 3 Drawing Sheets

METHOD OF FORMING A CORNER PART OF A WEATHER STRIP

BACKGROUND OF THE INVENTION

1. Field of the Invention

The present invention relates to a method of forming a weather strip to be attached around a door opening in a motor vehicle and, more particularly, to a method of forming a corner part of such a weather strip.

2. Description of Related Art

A weather strip to be attached around a door opening of a motor vehicle has a trim portion to be secured to a body panel around the door opening, and a seal portion projecting from an outside wall of the trim portion which is pressed by a peripheral edge of a vehicle door. The weather strip thus arranged is generally formed by integrally extruding the trim portion and seal portion.

To attach the weather strip around the door opening, it is necessary to bend it to conform to the corners of the opening. However, bending the weather strip deforms the cross-sectional shape of the seal portion which degrades the sealing properties thereof. To overcome this problem, the following method has been adopted.

A seal portion of an extruded weather strip is cut off in the part to be attached to a corner of the door opening, and a remaining trim portion of this part is bent to a corner configuration and placed in a mold. Then, a molding material is injected into the mold to form a molded seal portion having a cross-section substantially identical to that of the extruded weather strip onto the remaining trim portion.

FIG. 1 illustrates a trim portion placed in a mold 10. The mold 10 has a cavity 12 having a letter C-shaped cross-section and a corner configuration, which is adapted to form a molded seal portion. A gate 18 and supply passageway 20 provide a flow passageway to the cavity 12 for injecting a molding material thereinto.

A trim portion 14 remaining uncut in a weather strip W is bent and placed in the mold 10. A molding material is injected into the cavity 12 by way of the supply passageway 20 and flows through the gate 18 from the end of the cavity 12 towards a cut edge 22 of a seal portion 24 while diverging rightwards and leftwards, as shown by arrows in FIGS. 1, 2 and 3. Thus, a molded seal portion 26 which is joined to the extruded weather strip W is formed. Thereafter, the mold 10 is opened and a core member 16 is removed.

The above-described conventional method, however, exhibits the problem that unmolded spaces 28 may be generated at angular corners of the molded seal portion 26 due to shortage of the molding material, as shown in FIG. 2. Furthermore, as shown in FIG. 3, wrinkles 30 may be formed around such angular corners due to excess molding material being supplied. These problems result from inevitable variations in the injection amount, injection pressure, viscosity or the like of the molding material. When the weather strip W is attached to a vehicle body, these molding defects 28 and 30 are visible and degrade the appearance quality and sealing properties of the weather strip.

SUMMARY OF THE INVENTION

Accordingly, it is an object of the present invention to provide a method of forming a corner part of weather strip without generating molding defects due to variations in the injection amount, injection pressure or the like of a molding material.

With the method in accordance with the present invention, a weather strip is extruded to have a trim portion and seal portion formed on one of the side walls of the trim portion. The extruded seal portion is cut off from the part adapted to define a corner part of the weather strip. A remaining trim portion of that part is bent to a corner configuration and is placed in a mold, and a molding material for the seal portion is injected into a cavity of the mold, which has a corner configuration, to form a molded seal portion onto the one side wall of the bent trim portion such that the cross sectional shape of the molded seal portion is substantially identical to that of the extruded seal portion. Longitudinal ends of the molded seal portion are joined to the extruded seal portion, and a longitudinally extending base end edge of the molded seal portion is joined to the bent trim portion. With the method in accordance with the present invention, the molding material is injected from the longitudinally extending base end edge of the molded seal portion such that the molding material flows from the longitudinally extending base end edge towards a distal end edge of the molded seal portion. The joining of the longitudinal ends of the molded seal portion to the extruded seal portion and joining of the longitudinally extending base end edge of the molded seal portion to the bent trim portion are performed before the molding material fills the cavity entirely to mold the distal end edge of the molded seal portion.

With the method in accordance with the present invention, the trim portion remaining in one part of the extruded weather strip may have a U-shaped cross-section and be bent to a corner configuration with an opening facing radially outward, and the molded seal portion formed onto the one side wall of the bent trim portion may have a C-shaped cross-section. The longitudinal ends of the molded seal portion may be joined to the seal portion of the extruded weather strip, the longitudinally extending base end edge thereof may be joined to the one side wall of the bent trim portion along a radially inward end edge, and the distal end edge of the molded seal portion may face and be a short distance from a radially outward end edge of the side wall of the bent trim portion on the radial outside thereof.

Furthermore, the molding material may be injected into the cavity from a position central to the longitudinally extending base end edge of the molded seal portion. In addition, the mold may have vent passageways which are interconnected with a distal end of the cavity, which is adapted to mold the distal end edge of the molded seal portion, for storing excess molding material. The resultant projections formed with the vent passageways are cut off from the distal end edge of the molded seal portion.

With the method of the present invention, even when the molding material injection amount, injection pressure or the like varies, there is no molding defect at the angular corners of the resultant molded seal portion, which are defined by a cut edge of the seal portion. Furthermore, any molding defect occuring in a distal end edge of the resultant molded seal portion is concealed from external view in the attached weather strip, and the sealing properties of the weather strip are not degraded.

Other objects, features, and characteristics of the present invention will become apparent upon consideration of the following description and the appended claims with reference to the accompanying drawings, all of which forms a part of this specification.

DETAILED DESCRIPTION OF THE PRESENTLY PREFERRED EXEMPLARY EMBODIMENTS

Figure 1:
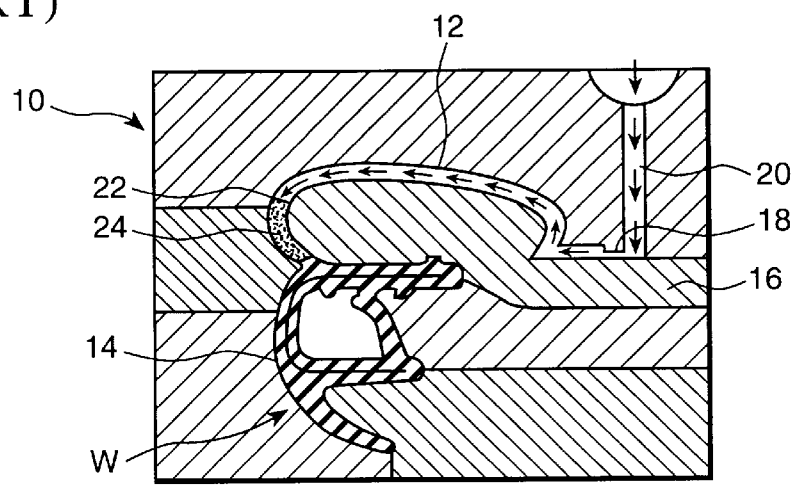
FIG. 1 is a cross-sectional view of a mold adapted to form a molded seal portion onto a corner part of a weather strip with a conventional method.
Figure 2:
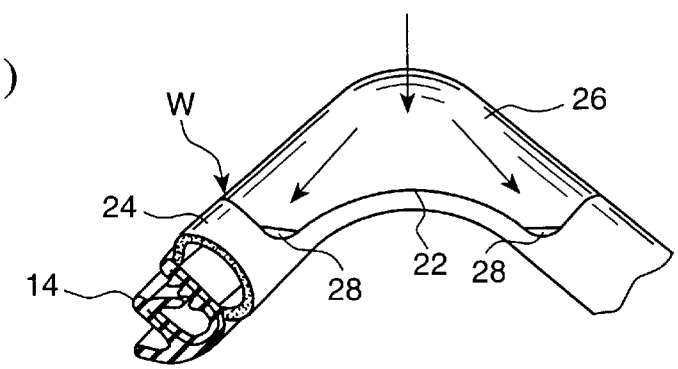
FIGS. 2 and 3 are schematic diagrams, each illustrating the flowing direction of a molding material along with molding defects upon molding the seal portion with the conventional method.
Figure 3:
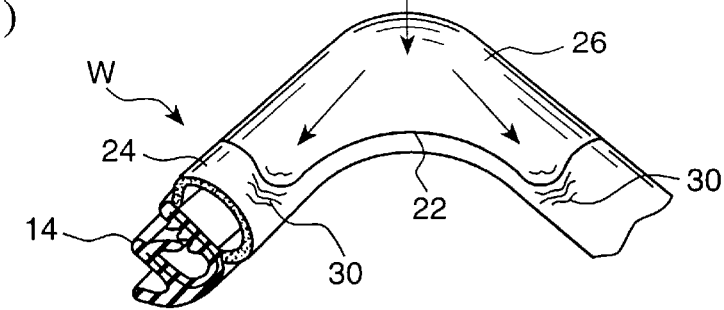
Figure 4:
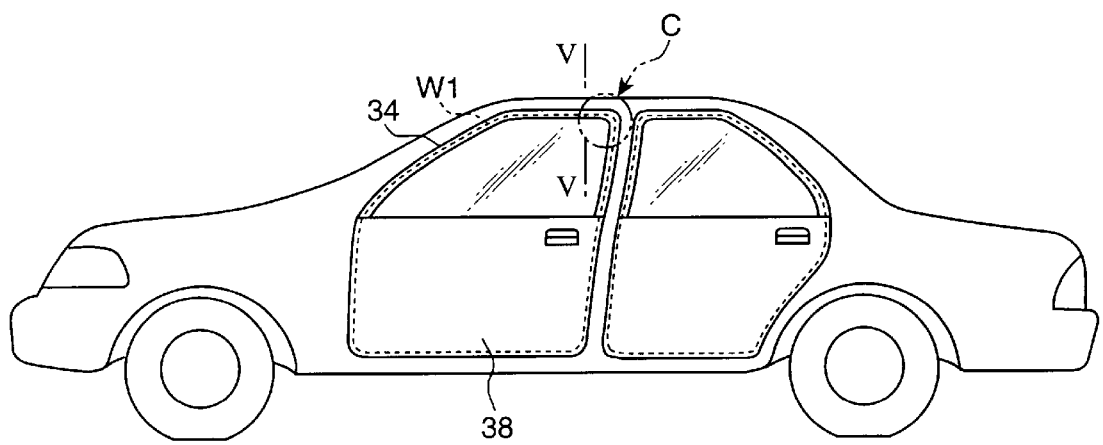
FIG. 4 is a side elevational view of a motor vehicle around a door opening having an attached weather strip formed with the method of the present invention.
Figure 5:
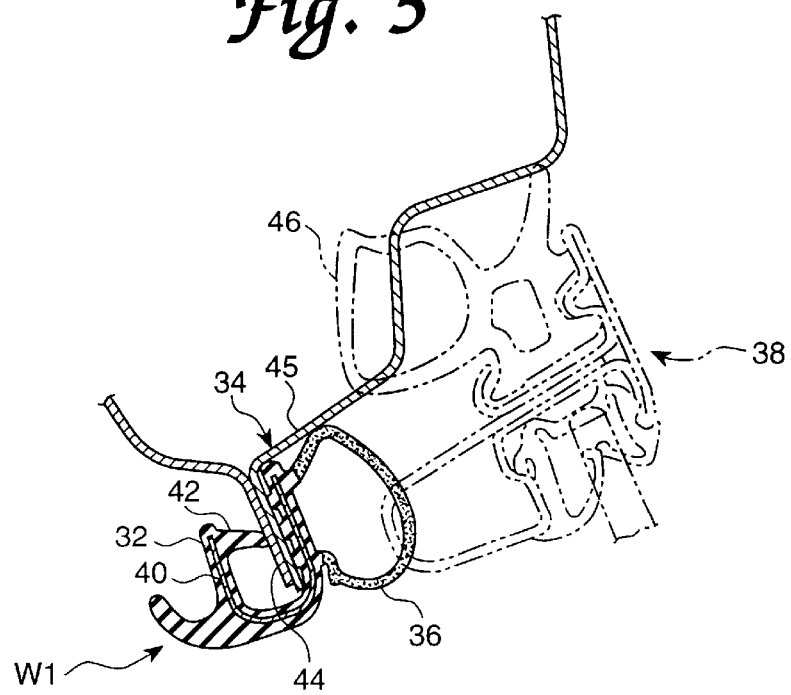
FIG. 5 is a cross-sectional view taken along the line V—V of FIG. 4.

As shown in FIG. 4, a weather strip W1 is attached along a door opening 34 in a vehicle body. As shown in FIG. 5, the weather strip W1 includes a trim portion 32 having a generally U-shaped cross-section, and a tubular seal portion 36 projecting from an outside wall of the trim portion 32 to be pressed by a peripheral edge of a vehicle door 38. The weather strip W1 is formed by extruding the trim portion 32 and seal portion 36 integrally. The trim portion 32 is composed of solid rubber, and a large number of insert elements 40 are embedded therein separately in a longitudinal direction of the weather strip W1. The seal portion 36 is composed of sponge rubber. Holding lips 42 project from opposite inside walls of the trim portion 32. The weather strip W1 thus arranged is attached along the door opening 34 by holding a flange 44 around the door opening 34 with the holding lips 42 of the trim portion 32. In FIG. 5, reference numeral 46 designates a door weather strip.

A corner part of the weather strip W1, adapted to be attached to a corner of the door opening 34, and designated as C in FIG. 4, is formed as follows.

Figure 6:
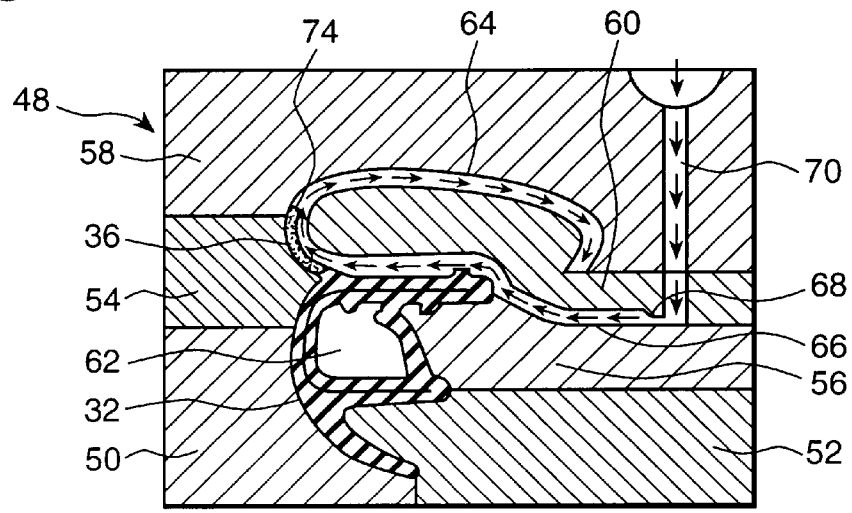
FIG. 6 is a cross-sectional view of a mold adapted to form a molded seal portion onto a corner part of a weather strip with one example of a method in accordance with the present invention.

The seal portion 36 of the extruded weather strip W1 is cut off in the part adapted to define the corner part of the weather strip. Then, the remaining trim portion 32 of that part of the weather strip W1 is bent to a corner configuration with an opening thereof located on the radially outward portion thereof, and placed in a mold 48. FIG. 6 illustrates the trim portion 32 placed in the mold 48. The mold 48 includes lower mold members 50 and 52 middle mold members 54 and 56, upper mold member 58 and core member 60 to define a cavity 62 adapted to receive the trim portion 32, and a cavity 64 adapted to receive injected molding material for the seal portion (sponge rubber) to form a molded seal portion.

The cavity 64 has a configuration which extends along an outside wall of the trim portion 32 placed in the cavity 62 from the opening thereof to the radially inward portion thereof, and further curves to a letter C-shaped cross-section. A distal end of the cavity 64 bends inwardly and faces only a short distance from the outside wall of the trim portion 32. The cavity 64 also has an elongated channel 66 which is interconnected with the C-shaped part thereof at about the opening of the trim portion 32 and extends in a direction opposite to that of the C-shaped part. The mold 48 further includes a gate 68 positioned at a radially distant end of the elongation channel 66 from a center of the corner for interconnecting the elongated channel 66 with a molding material supply passageway 70.

Figure 7:
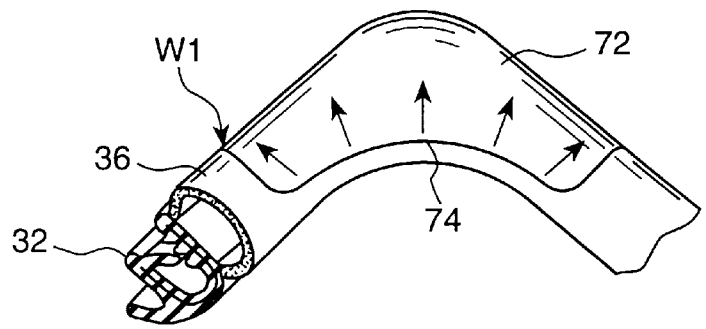
FIG. 7 is a schematic diagram illustrating the flowing direction of a molding material upon molding the seal portion with one example, of the method in accordance with the present invention.

After placing the trim portion 32 in the mold 48, the mold 48 is closed and a molding material is injected into the cavity 64 by way of the supply passage 70 and through the gate 68. The molding material flows in the cavity 64 towards the distal end of the cavity 64, as shown by the arrows in FIG. 6. FIG. 7 illustrates the configuration of a molded seal portion 72 and the flowing direction of the molding material in the molding step. The molding material injected from the gate 68 flows along the outside wall of the trim portion 32 while diverging rightwards and leftwards in the cavity 64, and reaches a cut edge 74 of the extruded seal portion 36. The molding material further flows towards the distal end of the cavity 64 to fill the cavity 64 entirely.

After the sealing portion 72 is molded, the mold 48 is opened and the core member 60 is removed. Thereafter, the part molded with the elongation 66 of the cavity 64 is cut off. The radially outward portion of the resulting molded seal portion 72 curves outwardly of the trim portion 32 to ensure a sufficient amount of lap with a body panel 45 around the door opening 34 (See FIG. 5);

As described above, with the method in accordance with the present invention, the cavity 64 is gradually filled with the molding material from its base end along the trim portion 32 to its distal end adapted to form the distal end edge of the molded seal portion 72, passing the cut edge 74 of the seal portion 36. Consequently, even with an excess or shortage of molding material, or variation in the injection pressure, the molded seal portion does not exhibit shortage of the molding material at the angular corners along the cut edge 74 of the seal portion 36, nor wrinkles therearound, which have been encountered with the above-described conventional method. Furthermore, if shortage of or excess molding material at the distal end of the cavity 64 forms irregularities in the distal end edge of the resultant molded seal portion 72, the irregularities do not cause problems, because the distal end edge of the molded seal portion 72 is concealed from view by the body panel 45 around the door opening 34, and such irregularities do not degrade the sealing properties of the weather strip W1.

Figure 8:
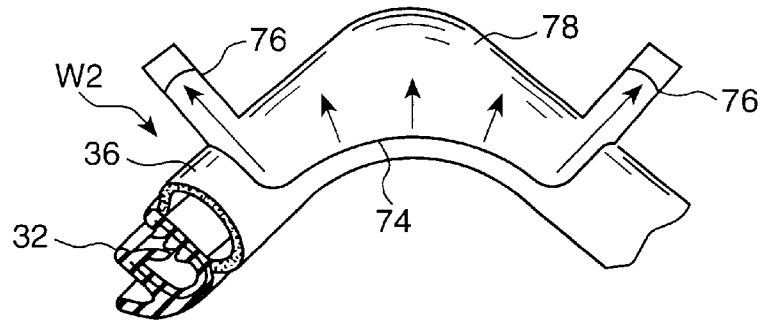
FIG. 8 is a schematic diagram illustrating the flowing direction of a molding material upon molding the seal portion with another example of the method in accordance with the present invention.

With the method in accordance with the present invention, since the distal end edge of the molded seal portion 72 is concealed with the body panel 45 upon being attached to the vehicle body, it is possible to provide vent passageways 76 in the mold so as to be interconnected with the distal end of the cavity, and preferably, near a borderline between a molded seal portion 78 and the extruded seal portion 36, as shown in FIG. 8. The vent passageways 76 store excess molding material. With this arrangement, even if excessive molding material is supplied into the cavity, the molded seal portion 78 of a resultant weather strip W2 is prevented from generating irregularities in the distal end edge thereof, and resultant projections formed by excessive molding material can be readily cut off.

In the preceding embodiments, the seal portion of the extruded weather strip, which is adapted to define the corner part, is cut off while leaving the part along the trim portion uncut. Alternatively, the seal portion adapted to define the corner part may be cut off entirely.

With the method in accordance with the present invention, a seal portion can be molded onto a corner part of the weather strip without generating any wrinkle or shortage of the molding material, which would degrade the appearance quality and sealing properties of the weather strip.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

We claim:

1. A method of forming a corner part of a weather strip, said weather strip having a trim portion and a seal portion formed on a side wall of the trim portion, comprising:

preparing an extruded weather strip having said trim portion and said seal portion;

cutting off said seal portion of one part of said extruded weather strip, which is adapted to define the corner part thereof;

bending said trim portion of said one part of said extruded weather strip to a corner configuration;

placing a bent trim portion in a mold;

injecting a molding material into a cavity of said mold to form a molded seal portion onto the side wall of said bent trim portion such that a cross sectional shape of said molded seal portion is substantially identical to that of said seal portion of said extruded weather strip;

joining longitudinal ends of said molded seal portion to said seal portion of said extruded weather strip; and joining a longitudinally extending base end edge of said molded seal portion to said bent trim portion, said molding material being injected from a position corresponding to said longitudinally extending base end edge of said molded seal portion such that said molding material flows from a side of said longitudinally extending base end edge of said molded seal portion, along an outside wall of said trim portion, and towards a distal end edge thereof to fill said cavity.

2. A method as claimed in claim 1, wherein said trim portion of said extruded weather strip has a U-shaped cross-section and is bent to a corner configuration having an opening facing radially outward, said molded seal portion has a C-shaped cross-section, said longitudinally extending base end edge is joined to one side wall of said bent trim portion along an end edge on the radial inside thereof, and a distal end edge of said molded seal portion faces an end edge of a radially outward side wall of the bent trim portion, said distal and edge being spaced a small distance from said bent trim portion side wall.

3. A method as claimed in claim 2, wherein said molding material is injected into said cavity from a position approximately central to said longitudinally extending base end edge of said molded seal portion.

4. A method as claimed in claim 2, wherein said mold has vent passageways interconnected with a distal end of the cavity, which distal end is adapted to mold said distal end edge of said molded seal portion, near a borderline between said molded seal portion and said seal portion of said extruded weather strip for storing excess molding material, said method further comprising the step of:

cutting off resultant projections formed with said vent passageways from said distal end edge of said molded seal portion.

\* \* \* \* \*